United States Patent [19]

Henderson et al.

[11] Patent Number: 5,050,144
[45] Date of Patent: Sep. 17, 1991

[54] RECORDING INTENSITY MODULATED SIGNALS AND POLARIZATION-MODULATED OPTICAL SIGNALS IN THE SAME AREA OF A STORAGE MEMBER

[75] Inventors: Ian E. Henderson; Morovat Tayefeh, both of Tucson, Ariz.

[73] Assignee: International Business Machines Corporation, Armonk, N.Y.

[21] Appl. No.: 449,260

[22] Filed: Dec. 11, 1989

[51] Int. Cl.⁵ .................. G11B 11/18; G11B 11/00
[52] U.S. Cl. .................. 369/13; 360/114; 360/77.03; 369/44.26; 369/44.29; 365/122
[58] Field of Search .................. 250/201.5, 204; 360/46–48, 67, 114, 59; 369/13–15, 44.11, 44.12, 44.42, 59, 110, 44.14, 44.26, 44.27, 44.29, 44.35; 365/122

[56] References Cited

U.S. PATENT DOCUMENTS

| | | | |
|---|---|---|---|
| 4,151,571 | 4/1979 | Cardot et al. | 360/77 |
| 4,424,543 | 1/1984 | Lewis et al. | 360/135 |
| 4,428,075 | 1/1984 | Hazel | 369/44.26 |
| 4,432,082 | 2/1984 | Hsieh | 369/44.29 |
| 4,435,797 | 3/1984 | Hsieh | 369/44.26 |
| 4,443,870 | 4/1984 | Hazel | 369/44.26 |
| 4,455,632 | 6/1984 | Braat | 369/44.35 |
| 4,636,885 | 1/1987 | Yamada | 360/78 |
| 4,669,003 | 5/1987 | Bell et al. | 360/77 |
| 4,669,004 | 5/1987 | Moon et al. | 360/77 |
| 4,730,289 | 3/1988 | Saitoh | 360/114 |
| 4,785,167 | 11/1988 | Madrid | 250/214 A |
| 4,785,438 | 11/1988 | Mizunoe | 360/114 |
| 4,797,868 | 1/1989 | Ando | 360/114 |
| 4,814,903 | 3/1989 | Kulakowski et al. | 360/48 |
| 4,853,923 | 8/1989 | Yamada | 369/120 |
| 4,978,950 | 12/1990 | Capps | 365/122 |

FOREIGN PATENT DOCUMENTS

| 0158042 | 7/1986 | Japan | 369/44.27 |
|---|---|---|---|
| 0188067 | 8/1987 | Japan | 369/44.26 |

*Primary Examiner*—David Trafton
*Assistant Examiner*—John Pokotylo
*Attorney, Agent, or Firm*—H. F. Somermeyer

[57] ABSTRACT

A magnetooptic disk has circumferentially-spaced-apart, radially-aligned embossed sector areas which indicate data storage tracks. The sector areas include embossed signals which indicate track-following information, and in a second area which trails the track-following information, track-seeking information is carried by the embossed signals. A magnetooptic coating covers the entire disk including the embossed sector areas. Readback clock synchronization signals are recorded over the track-seeking area to enable synchronizing a readback phase-locked loop such that more of the areas between sector areas can be used for recording data signals. During track seeking, the track seek controlling embossed signals are read using intensity demodulation, while in track following, during a readback, the clock signals recorded over the embossing are read for synchronizing the readback circuits. During recording, the synchronization signals are recorded over the embossed area dedicated to track seeking.

12 Claims, 1 Drawing Sheet

RECORDING INTENSITY MODULATED SIGNALS AND POLARIZATION-MODULATED OPTICAL SIGNALS IN THE SAME AREA OF A STORAGE MEMBER

FIELD OF THE INVENTION

The present invention relates to optical disk recorders, and more particularly to those optical disk recorders employing media having magnetooptic coatings, as well as intensity-modulation recorded signals such as molded or embossed signals, which are represented by recording surface fluctuations.

BACKGROUND OF THE INVENTION

Optical disks often employ grooved media for identifying storage track areas at high track densities. Removal of grooves would be a great advantage. Another factor in optical disk is space utilization; i.e., the less area dedicated to controlling the operation of the recorder using the optical storage medium, the more efficient data storage becomes. Accordingly, it is desired to provide multiple uses of the control area dedicated for controlling a recorder utilizing the storage media.

Many optical disks are so-called hard-sectored; i.e., control information is embossed along radial lines for identifying sectors. The sectors, or the spaces between the embossed areas, circumferentially identify the signal storing tracks. There will be a large number of such tracks on each disk surface. In many optical disks, the storage of data signals intensity modulates a reading light beam such that a single detector can detect both the embossed control area and the data area which can be phase-change modulated, color modulated (using dyes), or ablative recording which introduces pits into the area for representing data signals.

Another form of optical recording is the well-known magnetooptic recording. In magnetooptic recording, the recorded information is sensed by measuring the linear polarization rotation of the reading light beam reflected from the magnetooptic disk. Accordingly, two detectors are required. One for reading the control information and another required for reading the data information. Further, the embossed area requires a relatively large portion of the disk, therefore, it is desired to provide multiple usage of the embossed area for reducing the control signal overhead for the magnetooptic disk. Hereinafter, magnetooptic is identified by the abbreviation "MO".

DISCUSSION OF THE PRIOR ART

Bell et al., U.S. Pat. No. 4,669,003; Yamada, U.S. Pat. No. 4,636,885; and Cardot et al., U.S. Pat. No. 4,151,571 all show sector servos in magnetic recording disks which include not only track-following control information but also readback clock synchronization signals. All of the signals on such disks are read using a single magnetic detector, as is known. Kulakowski et al., in U.S. Pat. No. 4,814,903 shows a dual usage of disk sectors for track-jumping areas, as well as providing spare sectors on an optical storage medium. The usage of the sectors is either exclusively for storing data as a spare sector or for track jumping.

Co-pending, commonly-assigned application for patent by Tayefeh (Ser. No. 07/448,550) shows a detector usable to detect both MO signals and intensity modulated signals. This showing provides an efficient way of reading both MO modulated signals and intensity modulated signals; no limitation to using a signal detector for reading both signals is intended with respect to the practice of the present invention.

SUMMARY OF THE INVENTION

It is an object of the invention to provide an enhanced MO storage member, which is hard-sectored, for enabling recording magnetooptic signals over embossed areas and for selectively reading either the embossed areas as intensity signals or reading the MO signals.

An apparatus for reading signals from a magnetooptic disk having a continuous MO recording layer disposed over flat recording areas and control embossed areas. Readback means sense the signals recorded on the disk including MO signals recorded in the embossed areas in addition to sensing MO signals in the flat or non-embossed areas.

The foregoing and other objects, features and advantages of the invention will be apparent from the following more particular description of preferred embodiments of the invention, as illustrated in the accompanying drawings.

DETAILED DESCRIPTION

Referring now more particularly to the appended drawing, like numerals indicate like parts in the two figures.

Figure 1:
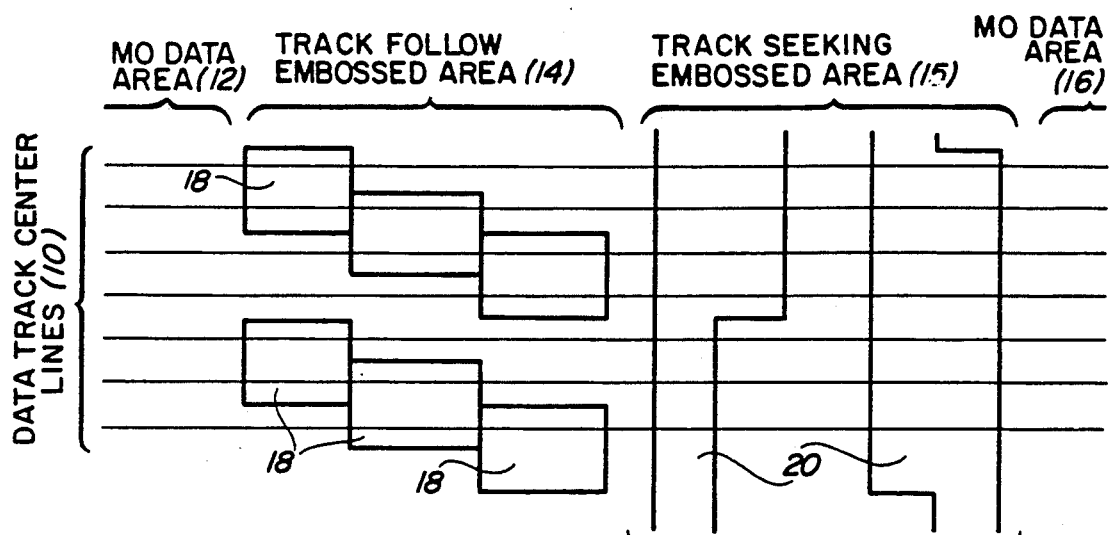
FIG. 1 diagrammatically shows an embossed area with magnetooptic coating thereon for recording both intensity modulated signals and magnetooptic recorded signals.

An MO disk 30, rotatable on shaft 31, is a hard-sectored disk such as shown in FIG. 1. The hard-sectoring includes embossed areas 14 and 15, which are circumferentially interposed on a plurality of data tracks represented by center lines 10 of areas 12 and 16. The track-following embossed area 14 includes a plurality of embossed portions 18 arranged to enable identification of the track center lines 10 as a light beam is scanning any one of the tracks represented by center lines 10. Operation of such track following is well known and not further described for that reason. Additionally, area 15 is provided for enabling enhanced track seeking by providing embossed portions 20 which are preferably Gray code modulated in circumferential width along the radial direction. Such Gray code encoding is known and its application to track seeking for identifying radial position during a track seek is well known. Because of the relatively low frequency of change in the radial direction of the Gray coded portions 20, relatively reliable radial positioning control can be achieved even during rapid track-seeking motions. In addition to areas 14 and 15 in the hard-sectored areas, a track address and sector address may also be employed. If the track-seeking embossed area 15 is dispensed with, then such addresses can be inserted in place of the track-seeking area 15.

The signals recorded on MO disk 30, whether embossed for intensity modulating a read beam, or MO recorded for linear polarization rotating a read beam, is sensed by a magnetooptic system 32 of known design via a dual direction light path 33, as is known. Magnetooptic system 32 includes a laser for supplying a read or write beam over path 32. The supplied beams are reflected by the surface of MO disk 30 back into the magnetooptic system 32. The read beams are processed optically (as known) to provide a p-component signal over a light beam path 34 and an s-component optical signal over light path 35. Also included in magnetooptic system 32 are the usual focusing systems and track-following and track-seeking systems.

Figure 2:
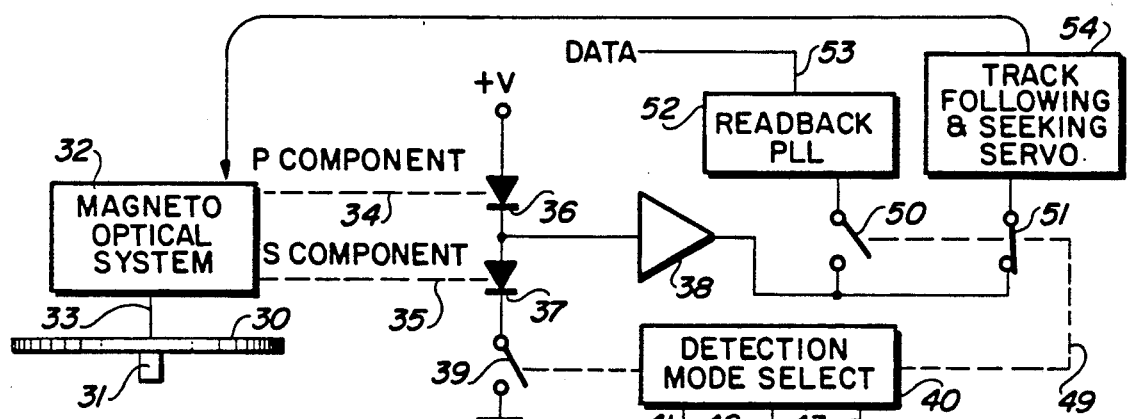
FIG. 2 is a simplified schematic diagram showing readback of signals from an embossed area of either the intensity modulated signals or the MO modulated signals.

Cascode connected diodes 36, 37 extend between a +V voltage supply and a ground reference potential respectively receive the p- and s-component optical signals for generating an electrical signal therefrom. Operational amplifier 38 has its input connected to the common connection between diodes 36 and 37 for supplying a differential signal through the closed switch 50 to readback PLL 54 for supplying data signals over line 53. This arrangement is a data readback detection system for magnetooptically modulated signals. Switch 50 is preferably closed only when data signals are to be read. The photodiodes 36 and 37 are oriented in the same direction, as indicated in FIG. 2.

To switch between detecting intensity modulated signals and magnetooptically modulated signals, electronic switch 39 is interposed between the cathode of photodiode 37 and ground reference potential. Detection mode select circuit 40 selectively opens and closes electronic switch 39. When electronic switch 39 is closed magnetooptic modulated signals are detected by readback PLL (phase-lock loop) 54. Accordingly, detection mode select circuit 40, as indicated by dashed line 49, synchronously closes switch 50 with the closing of switch 39.

When switch 39 is opened, then photodiode 37 is effectively taken out of the circuit; photodiode 36 becomes the sole detector which is an intensity-modulation light detector.

Intensity-modulated detected signals, as supplied through operational amplifier 38, through the now-closed switch 51, and to servo circuits 54. Servo circuits 54 supply servo control signal to magnetooptical system 32 for controlling the track following and track seeking servo, as is known. Switches 50 and 51 are alternately closed or opened by detection mode select circuit 40. The opening and closing of switches 39, 50 and 51 are synchronized to the rotational position of optical or MO disk 30. Such controls are well known, and additionally are shown by Kulakowski et al. in U.S. Pat. No. 4,814,903, which is incorporated herein by reference. This patent is also cited as prior art in the discussion of the prior art. A focus servo, not shown, is also employed in an optical system.

Mode of circuit 40 is controlled by a control means, such as shown by Kulakowski et al., and not detailed herein. When the optical recorder represented in the drawing is in a track-following mode, then a positive of signal is supplied over line 41 for indicating track following. In this mode, the track-follow embossed area 14 is sensed as for intensity modulated signals; i.e., embossment portions 18 are sensed using switch 39 open. Upon reaching the track-seeking embossed area 15, rather than reading the embossed portions 20, any magnetooptic recorded signals in embossed area 15 are read by closing switch 39. The intensity modulation of the reflected light beam is eliminated by the differential detection of the p and s components as described above. Any constructed embodiment of the present invention synchronizes readback PLL 52 to the movement of storage member or disk 30 at record and track-seeking embossed area 15. Upon exiting the area 15, the readback PLL 52 has been phase and frequency synchronized and MO data area 16 is immediately available for reading the recorded information. In the prior art, such PLL synchronization signals were recorded in the MO data area 16. By moving the PLL synchronization signals to area 15, an increase of several percentage points for data storage is provided to the optical storage member. As ariel densities increase, this percentage increase of storage area represents substantial increases in the amount of information storable on a single storage member.

In a track-seeking mode, the controller (not shown) provides a track-seek signal over line 42 causing the detection mode select circuit to keep switch 39 open while scanning the track-seeking embossed area 15. In a track-seek operation, no other signals need be sensed. When the optical recorder is to record information onto storage member 30 or to erase recorded signals from storage member 30, the control signal is supplied over line 43 to actuate detection mode select circuit 40 for disabling readback PLL 54 at all times, and enable and close switch 51, while opening switch 39, when reading the track-follow embossed area 14. When recording data signals, the PLL synchronization signals are recorded in track-seeking embossed area 15, followed by recording the data signals in MO data area 16. During erasing, the MO data area 16 may only be erased or alternately the track-seeking embossed area 15 may also be erased for erasing the MO storage signals.

It is also possible to simultaneously read embossed signals recorded in area 15; i.e., sector ID and track ID while reading MO signals. In this case, both switches 50 and 51 are closed such that the MO modulated signals are detected by readback PLL 52 and the intensity modulation signals would necessarily be provided through a separate detector in magnetooptic system 32 and supplied through closed switch 51 to servo circuits 54. In this instance, two separate optical detectors are required. One for the magnetooptic modulation and the other for the intensity modulation detection. These circuits are not shown because they are so well known.

Figure 3:
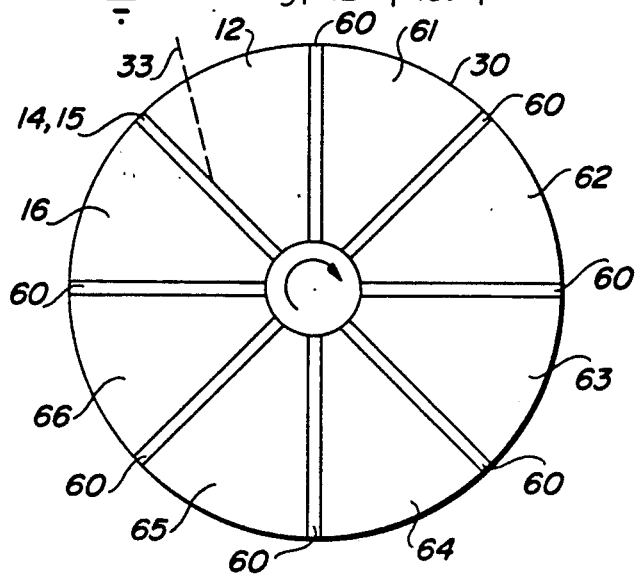
FIG. 3 is a plan view diagrammatically showing a magnetooptic disk using the present invention.

As seen in FIG. 3, disk 30 is circumferentially divided into a plurality of radially-extending sectors 61–66, inclusive. Sector 68 has MO area 12 while sector 67 has MO data area 16. The embossed areas 14, 15 are a portion of sector 67 (disk 30 is rotating in direction of arrow). Each of the sectors 61–66 have a leading embossed sector portion 60 corresponding to embossed area 14, 15. The difference between the leading sector portions 60, and area 14, 15 is the information represented by the embossing.

While the invention has been particularly shown and described with reference to preferred embodiments thereof, it will be understood by those skilled in the art that various changes in form and details may be made therein without departing from the spirit and scope of the invention.

What is claimed is:

1. In apparatus for reading signals from a magnetooptic disk which has embossed circumferentially spaced-apart mark areas among magnetooptic data recording areas and a magnetooptic coating over the entirety of the disk, first data patterns in the embossed mark areas recorded as surface fluctuations which reflect a light beam to intensity modulate a reflected light beam such that the reflected light carries the data pattern as an intensity modulation pattern, second data patterns in the embossed mark areas recorded in the magnetooptic coating and which coating reflects an impinging light beam to carry the second data pattern as modulated linear polarizations in the reflected light beam:

the improvement including, in combination:

readback means for sensing the embossed mark areas, said magnetooptic data recording areas including means for sensing data recorded as surface fluctuations in the embossed mark areas and magnetooptic modulated recorded data patterns in the data recording and embossed mark areas; and control means connected to the readback means for actuating the readback means to read magnetooptic signals recorded in the embossed mark areas.

2. In the apparatus set forth in claim 1 further including, in combination:

said control means including means for actuating the readback means to sense intensity modulations of the reflected light beam caused by said surface fluctuations to produce intensity modulated signals in a first portion of a first one of said mark embossed areas and sensing said rotated linear polarizations in the reflected light beam to produce magnetooptic modulated signals in a second portion of said first one of said embossed areas.

3. In the apparatus set forth in claim 2 further including, in combination:

seek indicating means connected to the control means for actuating said control means to control the readback means to sense the entirety of an embossed area for intensity modulated signals; and track-following indicating means connected to the control means for sensing actuating the control means to control the readback means to sense the second portion of the embossed area for magnetooptically modulated signals.

4. In the apparatus set forth in claim 3 further including, in combination:

said readback means having optical means for deriving p and s components of light reflected from the magnetooptic disk and said control means actuating the readback means to use both the p and s components in sensing the magnetooptic modulated signals and only one of the components in the sensing intensity modulated signals.

5. In the apparatus set forth in claim 4 further including, in combination:

first and second cascode-connected photodiodes in the readback means respectively for receiving said p and s components, circuit means connected to the photodiodes for activating same to detect the p and s components and deactivating means connected to the control means for responding to the control means indicating that intensity modulated signals are to be detected to deactivate one of the photodiodes such that all of the electrical signals come from but one of the photodiodes.

6. In the apparatus set forth in claim 5 further including, in combination:

said second portion of the embossed area storing a first data pattern as surface fluctuations and a second data pattern in said magnetooptic coating as a magnetic remanence pattern, said first data pattern indicating positional information and said second data pattern indicating a data synchronizing pattern for enabling synchronizing sense of data stored in the one of the data storing areas to be scanned for sensing after scanning and sensing said first portion;

said control means actuating said readback means for sensing the second data pattern of said second portion whereby the readback of data stored in the one data recording area is synchronized to the second data pattern recorded in said second portion.

7. In a machine-effected method of sensing signals recorded on a magnetooptic disk having embossed recorded signals and magnetooptic recorded signals, ones of said magnetooptic recorded signals being overlaid on predetermined ones of said embossed recorded signal, including, a plurality of machine-executed steps:

using intensity demodulation detection for sensing the embossed recorded signals;

using magnetooptic demodulation detection for sensing the magnetooptic recorded signals; and at first predetermined times, sensing at predetermined ones of said embossed recorded signals the magnetooptic recorded signals overlaid on said embossed recorded signals, and at second predetermined times sensing said predetermined ones of said embossed recorded signals.

8. In the machine-effected method set forth in claim 7, further including the machine-executed steps of:

while seeking to a track on the disk, sensing the embossed recorded signals using said intensity demodulation detection; and while track following on the disk, sensing a first portion of the predetermined ones of said embossed recorded signals using said intensity demodulation and sensing a second portion of the embossed recorded signals using said magnetooptic demodulation detection such that magnetooptic signals recorded over the embossed recorded signals are sensed during track following during said first predetermined times and said embossed recorded signals are sense during said second predetermined times.

9. In the machine-effected method set forth in claim 8, further including the machine-executed steps of:

while sensing said second portion for magnetooptic recorded signals, synchronizing data readback circuits preparatory to reading information-bearing magnetooptic signals recorded in a non-embossed area of the disk.

10. In magnetooptic data storage apparatus, including in combination:

a magnetooptic data storage member having a multiplicity of elongated data storage tracks, each track having spaced-apart embossed marks in embossed areas wherein such embossed marks store intensity modulating data, the storage member having magnetooptic storage properties in all of the tracks including the embossed areas, said storage member including predetermined magnetooptically recorded data in said embossed areas overlying the embossed marks;

readback means in operative relationship to the storage member for reading data stored in the embossed marks by intensity modulation of a sensing light beam shown onto a predetermined one of the tracks and for reading magnetooptically recorded data in the predetermined one of the tracks;

control means connected to the readback means for actuating the readback means while scanning any of the embossed areas to either read the intensity-modulating data of the respective embossed marks and/or the predetermined magnetooptically recorded data recorded in the embossed areas.

11. In the apparatus set forth in claim 10 further including, in combination:

said control means including sequencing means connected to the readback means for actuating the readback means for reading said intensity-modulating data from a first portion of a predetermined one of the embossed areas and reading said predetermined magnetooptically recorded data from a second portion of said predetermined one of the embossed areas.

12. In the apparatus set forth in claim 11 further including, in combination:

said intensity-modulating data comprising data indicating an address f a track and said predetermined magnetooptically recorded data recorded in each of the embossed areas indicating data synchronizing information; and said readback means reading said intensity-modulated data first and said predetermined magnetooptically recorded data second while scanning any one of said embossed areas.

* * * * *